Feb. 23, 1926.  
R. G. NULL  
1,574,682  
MACHINE FOR CALENDERING AND CUTTING SHEETS FORMED FROM PLASTIC MATERIALS  
Filed March 11, 1924 2 Sheets-Sheet 1
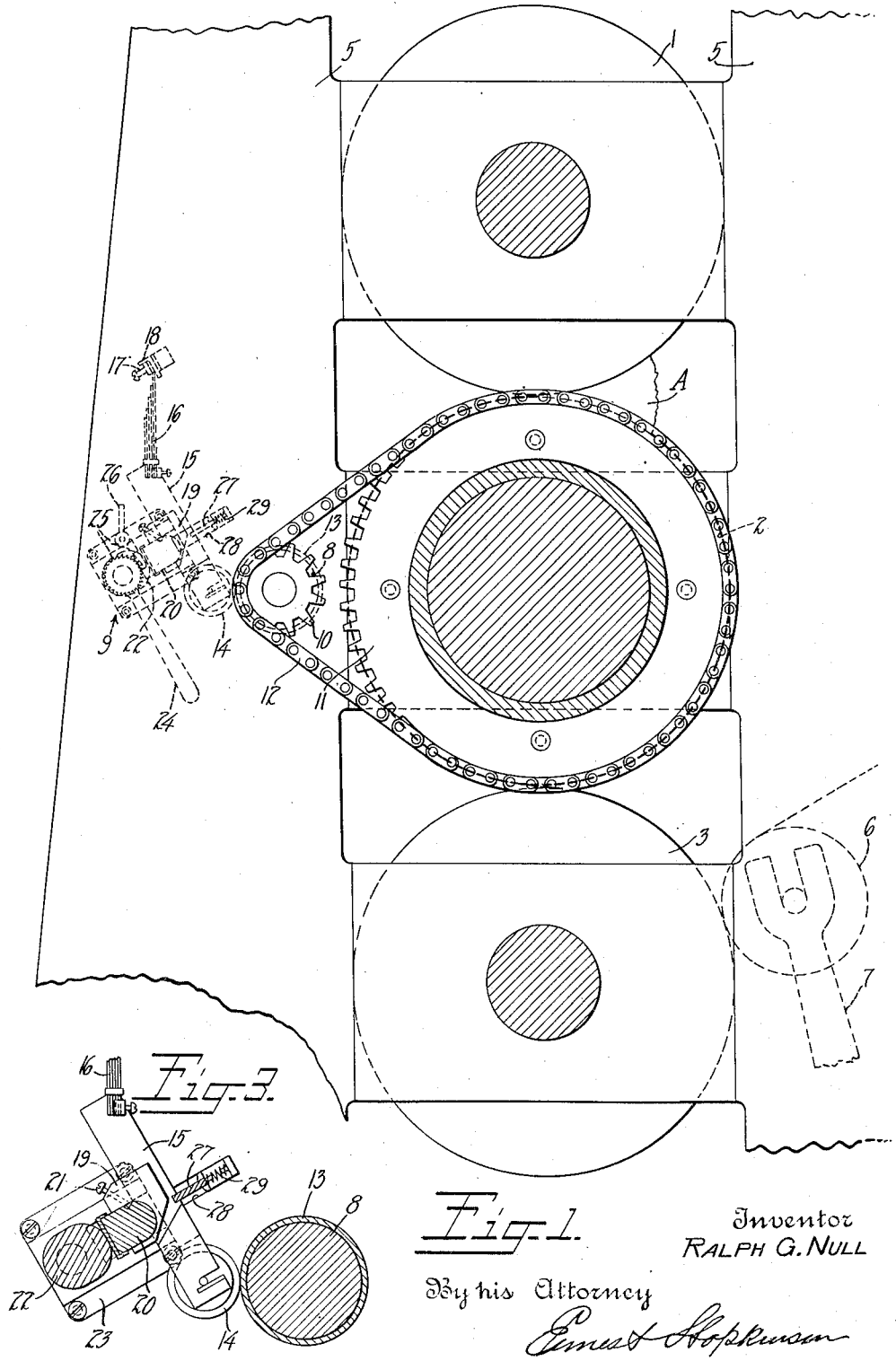
Inventor  
RALPH G. NULL  
By his Attorney

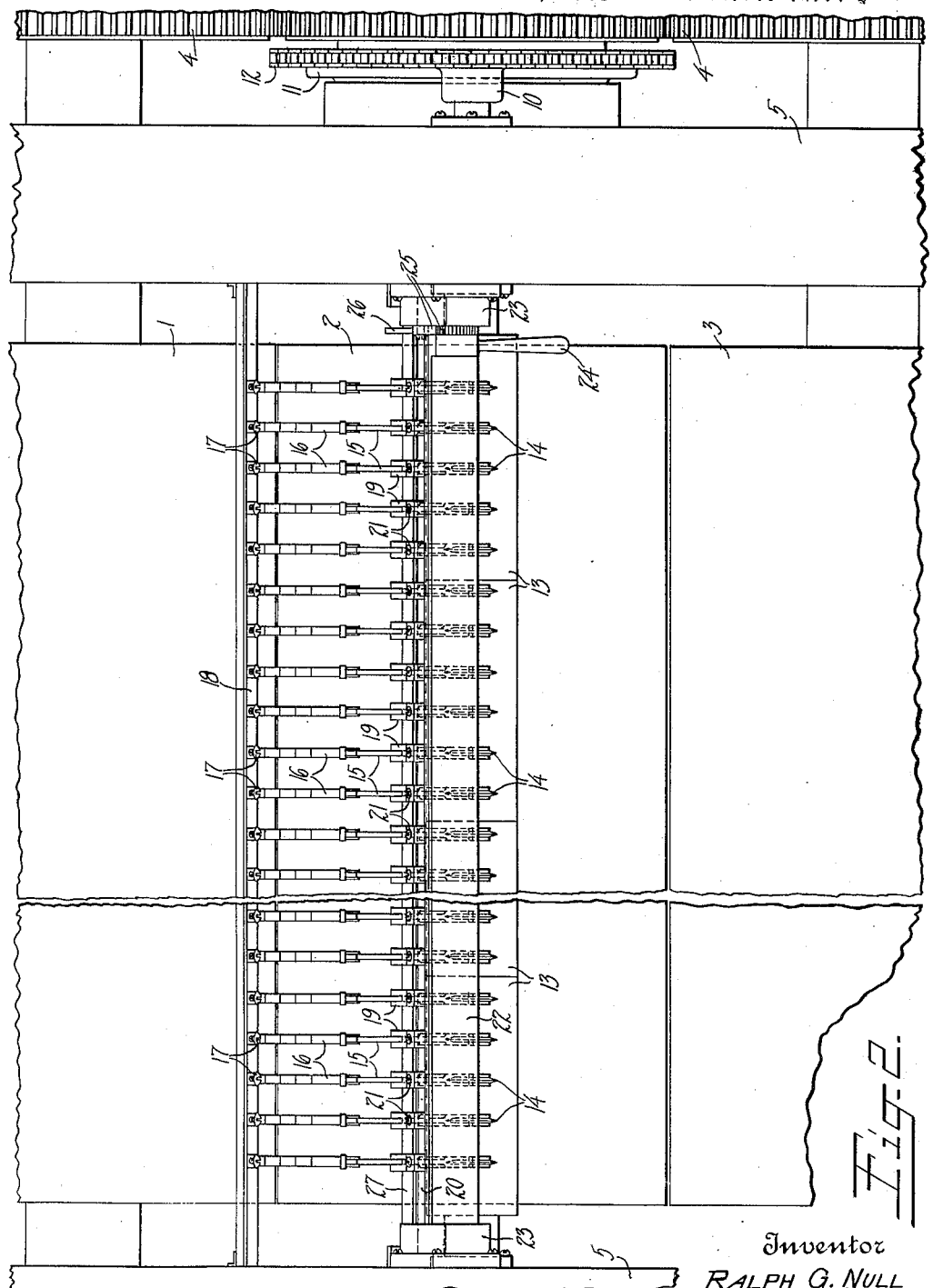

Patented Feb. 23, 1926.

1,574,682

UNITED STATES PATENT OFFICE.

RALPH G. NULL, OF INDIANAPOLIS, INDIANA, ASSIGNOR TO G & J TIRE COMPANY, OF INDIANAPOLIS, INDIANA, A CORPORATION OF INDIANA.

MACHINE FOR CALENDERING AND CUTTING SHEETS FORMED FROM PLASTIC MATERIALS.

Application filed March 11, 1924. Serial No. 698,352.

*To all whom it may concern:*

Be it known that I, RALPH G. NULL, a citizen of the United States, residing at Indianapolis, county of Marion, State of Indiana, have invented certain new and useful Improvements in Machines for Calendering and Cutting Sheets Formed from Plastic Materials, of which the following is a full, clear, and exact description.

This invention relates to machines for calendering and cutting sheets formed from plastic material, and has for its principal object the calendering of plastics into sheet form, or the coating of fabric with plastic material, and simultaneously therewith cutting of the sheet at any desired places by means entirely independent of the calendar rolls whereby the sheet as it is being formed may be cut into strips of any desired widths.

A further object of the invention is to provide means whereby thin sheets formed of plastic material may be cut into narrow strips and reeled up ready for subsequent use without in any way injuring the strip, that is to say, without destroying its uniformity of width and gauge.

Heretofore when it has been desired to produce strips from sheets of plastic material such as sheets of rubber or rubber compounds the compound has been calendered into sheet form and reeled up and then conveyed to the cutting machine where it has been unreeled and cut into the desired strips and then reeled up again or otherwise handled, or as an alternate method the cutters have cooperated directly with one of the calender rolls as a backing and the sheets thus cut into strips while supported on the calender. The first of these methods is slow and expensive, requiring the reeling and unreeling of the sheet upon the take-up roll between the calendering and cutting operations. The second method is particularly undesirable as the cutters soon destroy the face of the calender roll either requiring that it be repaired by trimming down or eventually discarded.

The present invention is directed to calendering and cutting the sheet at the one operation, thereby obviating the necessity of the intermediate steps of reeling and unreeling;—the cutting being accomplished entirely independent of the calender rolls, thereby removing any danger of injuring the rolls. Both objectionable features of the prior methods of forming the strips are thus overcome.

Referring to the drawings forming a part of this specification,

Figure 1 is a side elevation, partly in section, of a portion of the machine involving the present invention;

Figure 2 is an elevation of Figure 1 viewed from the left; and

Figure 3 is a transverse sectional view of the cutting feature of the invention.

The drawings show only a portion of a calendering machine. This, however, is believed sufficient for a clear understanding of the present invention and is intended to represent a conventional type of calendering machine as the invention is not confined to any particular type of machine. The three rolls 1, 2, 3 are intended to represent three calender rolls of the machine, and the gearing 4 to indicate the usual form of mechanism for driving same, all of which are supported in a framework 5 which also supports the various other features of the machine. A take-up roll 6 is mounted in the forked ends of swinging arms 7 in the usual way to bear against the calender roll 3 for driving the take-up roll 6 by frictional contact, the roll being employed for reeling the sheet of calendered material upon after it has been cut.

The plastic material, as for instance, rubber compound, is placed between the rolls 1 and 2 to provide a bank of plastic rubber A. This rubber is passed between the rolls 1 and 2 to the opposite side thereof to reduce it to sheet form and on the side of the machine to which the sheet is advancing and preferably somewhat below the bight between the rolls 1 and 2, a backing member 8 is mounted between the sides of the frame 5. The sheet of calendered stock passes around this member which serves as a backing for the cutters of the cutting device 9. The backing member may be of various constructions depending upon the nature of the material to be cut. For instance, if a sheet of rubber-coated fabric is to be cut into strips, a freely revoluble roll or even a fixed bar could be employed as a backing member, whereas if it is desired to calender a thin sheet of plastic and to cut it into narrow strips, the backing member should preferably be a roll mounted between the sides of the frame 5 as shown in the drawings which is positively driven preferably at the same lineal speed as the calender rolls. This is accomplished in the present instance by securing sprocket wheels 10 and 11 on the shafts of roll 8 and calender roll 2 respectively and connecting the two with a chain 12. Of course, when the machine is used for cutting rubberized fabric, a fourth calender roll would be employed above the roll 1 and the bank of rubber A would be placed between the fourth roll and the roll 1 on the left side as viewed in Figure 1, in order that the sheet of fabric may be passed from the right between the rolls 1 and 2 for receiving the coating of rubber carried by roll 1 from the rubber bank in the usual manner.

The roll 8 is preferably faced with a hard steel shell 13 to minimize the amount of injury which it is subjected to from the cutters and which may be made in sections if desired, four sections being shown in Figure 2 so that it will be possible to remove a section without removing the entire facing when it becomes too badly scored or defaced by the cutters to permit of further use.

The invention is not confined to any particular type of cutter or cutting device. In the present instance, however, rotatable disc cutters 14 are employed which bear against the sheet passing around the backing roll 8 and revolve during the cutting operation due to their frictional contact with the sheet of material or perhaps more strictly the backing roll 8. The cutting discs 14 are mounted in open slots in the bifurcated ends of supporting bars 15 which are provided at their opposite ends with the spring fingers 16. These fingers are provided at their free ends with adjusting screws 17 which abut the angle iron 18 which is secured to the sides of the frame 5. The bars 15 are supported in the bifurcated ends of the supports 19 which are secured to the bar 20 by means of the screws 21. It will thus be observed that by loosening the screws 21, the cutters and their attendant mechanisms may be shifted longitudinally of the bar 20 into any desired positions so that the sheet may be cut into strips of any desired width, certain of the cutters being removed in any instance, if desired. The bar 20 rests upon the cam bar 22 pivotally secured in the side supports 23 secured to the sides of the frame 5. An arm 24 is secured to this cam bar for turning it to advance the cutters into active positions as shown in Figure 3 or to withdraw them from action as desired. A pawl and ratchet mechanism 25 is provided so that the handle may be turned and the cutters adjusted, to any desired extent, a pawl handle 26 being provided to release the pawl to reverse the motion of the arm 24 when desired. The bars 15 are preferably held in spring-pressed engagement in their supports 19 by means of a bar 27 mounted to slide in the ways 28 and held in spring-pressed engagement against the bars 15 by means of the springs 29, which operate to force the cutters away from the backing roll 8 when the cam bar 22 is turned to the inoperative position.

In operating the machine more particularly for sheeting and cutting plastic material, the rubber compound or other plastic is placed as a bank between the rolls 1 and 2 in the usual way and the machine set into operation, the disc cutters being first spaced at the required distances apart to cut the sheet longitudinally in strips of the desired width. As the calender rolls 1 and 2 revolve the plastic passes between them in the form of a thin sheet, the usual provision being made for adjusting the calender rolls to space them apart to the required extent to produce a sheet of the desired thickness. The sheet being thus formed is passed over the backing roll 8 between the rolls 2 and 3 and around the take-up roll 6, the cutting discs first being withdrawn by manipulation of the handle 24. The handle is then moved in the opposite direction to bring the discs into operative engagement with the sheet and backing roll 8. The discs are thus rotated by their contact with the roll 8 which, in the present instance, is positively driven, and the sheet thereby cut into the required number of strips. The strips as they pass between the rolls 2 and 3, which are suitably adjusted to permit of this passing, are reeled together with a liner strip in the usual way upon the roll 6, while the edges of the sheet and any other portion not required to be reeled is permitted to remain on the calender roll 2 and to be thus brought back into the bank A.

It will thus be seen that very thin and narrow strips may be cut at the same time that the sheet is formed from the plastic material, and may be reeled up ready for use without any serious danger of being unduly pulled or stretched which would result in changing their widths and gauge. The machine operates continuously, for as soon as a reel of the cut strips of sufficient size has been formed it can be readily removed and another roll placed in the machine and the reeling up of the strips continued.

As many apparently widely different embodiments of this invention may be made without departing from the spirit thereof, it is to be understood that I do not intend to limit myself to the specific form of the invention as set forth except as indicated in the appended claims.

Having thus described my invention what

I claim and desire to protect by Letters Patent is:—

1. A machine of the class described comprising in combination, top, intermediate and bottom calender rolls, a revoluble backing roll spaced from the intermediate calender roll around which a calendered sheet may be passed from the bight between the top and intermediate calender rolls to the bight between the intermediate and bottom calender rolls, and a multiplicity of cutters coacting with said backing roll for slitting the sheet longitudinally as it is passed between successive bights of the calender rolls, whereby a calendered sheet may be cut into strips without subjecting the cut strips to a distorting tension.

2. A machine of the class described comprising, a pair of calendering rolls, a backing member spaced from the calendering rolls around which the calendered sheet after leaving the calendering rolls passes, a plurality of cutters coacting with said backing member for cutting the sheet longitudinally, and a roll adjacent one of the calendering rolls between which and said adjacent calendering roll the sheet passes after it has been cut.

3. A machine of the class described comprising, a pair of calendering rolls, a backing member spaced from the calendering rolls around which the calendered sheet after leaving the calendering rolls passes, a plurality of cutters coacting with said backing member for cutting the sheet longitudinally, a third roll adjacent one of the calendering rolls between which and said adjacent calendering roll the sheet after it has been cut passes, and a take-up roll upon which the cut sheet is wound.

4. A machine of the class described comprising, a pair of calendering rolls, a backing roll spaced from the calendering rolls around which the calendered sheet after leaving the calendering rolls passes, means for rotating the backing roll at the same lineal speed as the calendering rolls, a plurality of cutters coacting with said backing roll as it revolves for cutting the sheet longitudinally, a third roll adjacent one of the calendering rolls between which and the said adjacent calendering roll the sheet after it has been cut passes whereby the portions of the sheet not needed will remain of the said adjacent calender roll to thereby return to the bank between the calender rolls, and a take-up roll for receiving the remainder of the cut sheet.

Signed at Indianapolis, county of Marion, State of Indiana, this 8th day of March, 1924.

RALPH G. NULL.